(No Model.) 2 Sheets—Sheet 2.
A. PELTIER.
FLY TRAP.
No. 521,219. Patented June 12, 1894.
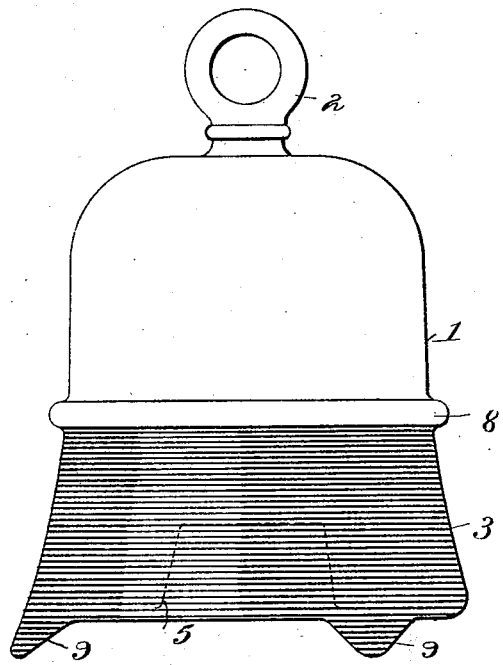
Fig. II.
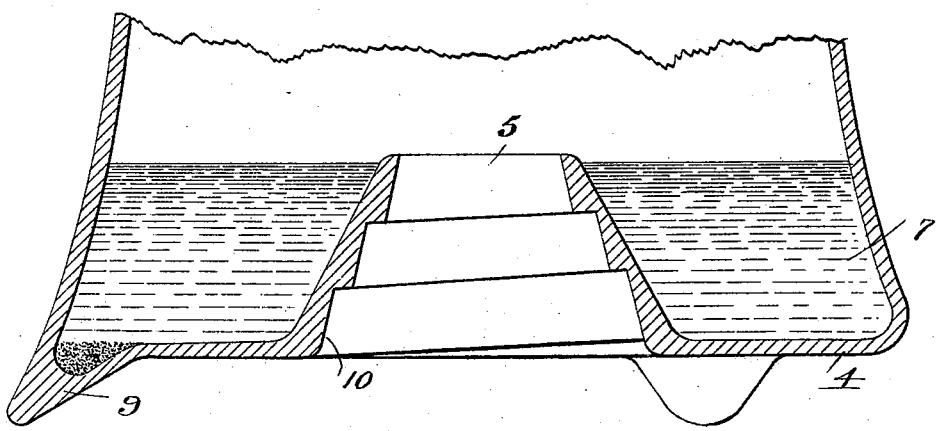
Fig. III.
Witnesses
J. Green
M. V. Bidgood
Inventor
Alphonse Peltier
By Knight Bros
Attys.

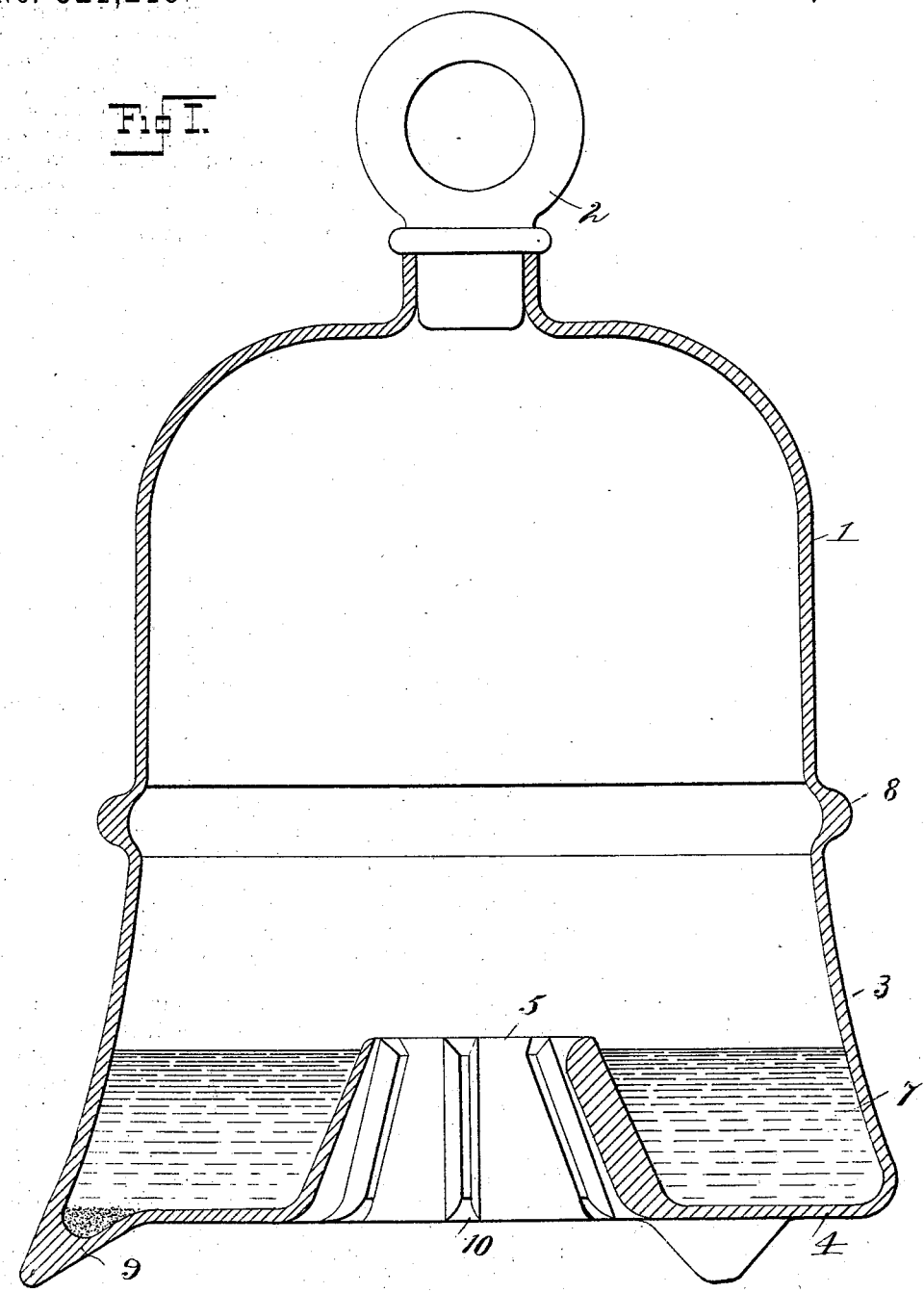

UNITED STATES PATENT OFFICE.

ALPHONSE PELTIER, OF BROOKLYN, NEW YORK.

FLY-TRAP.

SPECIFICATION forming part of Letters Patent No. 521,219, dated June 12, 1894.

Application filed February 5, 1894. Serial No. 499,201. (No model.)

*To all whom it may concern:*

Be it known that I, ALPHONSE PELTIER, a citizen of the United States, residing in Brooklyn, county of Kings, State of New York, have invented certain new and useful Improvements in Fly-Traps, of which the following is a specification.

My invention relates to those fly traps, usually made of glass, which are in the form of a flask and which have an opening at the bottom for the admission of flies and usually an opening at the top for the admission of liquid and for the purpose of cleaning, &c.

My invention involves certain detail improvements in such devices which will be first fully described with reference to the accompanying drawings and then specifically pointed out in the claims.

In said drawings: Figure I is a vertical sectional view of my improved fly trap. Fig. II is a side elevation of the same to a smaller scale. Fig. III is a partial sectional view illustrating a slight modification.

I preferably form the flask 1 in bell-shape, making its stopper 2 of form to simulate a bell handle. Usually when these flasks are made of glass, the glass is sufficiently transparent to permit a view from the outside of the dead flies which always accumulate in considerable numbers within the trap. It has been suggested that this defect be remedied by making the whole flask of dark-colored glass but it is found that such a method of construction renders the interior of the flask so dark as to materially affect the value of the device as a fly trap for its operation largely depends on the flies being attracted upward when they are once beneath the flask by a light above them. I make the upper part of the flask 1 of clear or transparent glass. I do not mean by this that it is necessarily colorless but it is not sufficiently obscured to materially obstruct the passage of light through it. The lower part of the flask I provide with a coating or shield 3 of opaque material. This may be a coating of paint or a metallic or other shield mechanically applied. This obscuring of the lower part of the flask not only hides the flies which have settled therein but has the following useful effect: The bottom 4 of the flask is made flat and of clear glass also. The light will therefore strike down through the upper part 1 and the bottom 4 of the flask and the darkened part 3 of the trap will aid in the focusing of the light rays so that a fly passing beneath the trap will have thrown on him from above, a strong light which will attract him upward through the opening 5 in the bottom.

I preferably make the neck 6 of the opening 5 of considerable height and somewhat tapered and by forming the bottom flat, I am enabled to provide a very large annular receptacle 7 for the liquid which receives the flies. About half way up the vessel I provide a ring or rings 8 preferably of somewhat thicker glass than the remaining wall and this serves as a line of demarcation in applying the opaque cover 3 and also serves to gather the rays of light and to project a bright ray which will attract the flies. By placing the fly trap so that a ray of light from the ring 8 will just touch the top of the tapering neck 6, a brilliant effect is produced which cannot fail to influence the flies to ascend.

Preferably, the flask is blown in a mold and the general construction shown is adapted to that end. The ring 8 and the hollow tapering legs 9 as well as the tapered neck 6 are all shaped for forming in, and drawing out, of a mold. Within the neck 6 I form ribs or ridges 10 which not only serve to direct the flies upward but afford numerous points for the refraction and reflection of light so aiding in attracting flies upward through the neck. These ribs or ridges may be arranged vertically as in Fig. I, or, in the form of spiral screws as in Fig. III.

Preferably the darkened surface 3 is extended down over the outer surface of the legs 9.

Having thus described my invention, the following is what I claim as new therein and desire to secure by Letters Patent—

1. A fly trap having its body formed of one piece of glass and comprising as integral parts of said body, the upper clear glass portion 1, the lower opaque glass portion 3 and the clear glass bottom portion 4, substantially as set forth.

2. A fly trap having its body formed of glass of one piece and having as integral parts of said body the upper clear glass portion 1, the lower opaque glass portion 3, the annular ring 8 of thick glass between said portions and the flat transparent glass bottom portion 4, substantially as set forth.

3. A fly trap having its body composed of glass in one piece and having a flat bottom 4 with the central inwardly tapering and internally ribbed neck 5 arranged and adapted to operate, substantially as set forth.

ALPHONSE PELTIER.

Witnesses:
HARRY E. KNIGHT,
M. V. BIDGOOD.